US 11,235,714 B2

(12) United States Patent
Cha et al.

(10) Patent No.: US 11,235,714 B2
(45) Date of Patent: Feb. 1, 2022

(54) VEHICLE POWER SUPPLY MODULE AND ARRANGEMENT METHOD THEREFOR

(71) Applicants: LCB International Inc., Tortola (VG); Wei Cha, Shanghai (CN); Wangjie Gesang, Shanghai (CN)

(72) Inventors: Wei Cha, Shanghai (CN); Wangjie Gesang, Shanghai (CN)

(73) Assignees: Wei Cha, Shanghai (CN); Wangjie Gesang, Shanghai (CN); LCB INTERNATIONAL INC., Tortola (VG)

( * ) Notice: Subject to any disclaimer, the term of this patent is extended or adjusted under 35 U.S.C. 154(b) by 166 days.

(21) Appl. No.: 16/606,009

(22) PCT Filed: Apr. 17, 2018

(86) PCT No.: PCT/CN2018/083273
§ 371 (c)(1),
(2) Date: Dec. 19, 2019

(87) PCT Pub. No.: WO2018/192464
PCT Pub. Date: Oct. 25, 2018

(65) Prior Publication Data
US 2021/0138906 A1 May 13, 2021

(30) Foreign Application Priority Data
Apr. 17, 2017 (CN) .......................... 201710251073.1

(51) Int. Cl.
H01M 10/20 (2006.01)
H01M 10/42 (2006.01)
(Continued)

(52) U.S. Cl.
CPC ................ B60R 16/02 (2013.01); B60L 1/00 (2013.01); B60L 50/51 (2019.02); B60L 50/60 (2019.02);
(Continued)

(58) Field of Classification Search
CPC .......... B60R 16/02; B60L 50/60; B60L 50/64; B60L 50/51; B60L 1/00; H01M 10/20;
(Continued)

(56) References Cited

U.S. PATENT DOCUMENTS 6,982,499 B1 * 1/2006 Kachi ................. B60L 15/2045
307/75
2005/0151509 A1 * 7/2005 Cook .................... H02J 7/0018
320/116
(Continued)

FOREIGN PATENT DOCUMENTS

CN 2935589 Y 8/2007
CN 101752886 A 6/2010
(Continued)

OTHER PUBLICATIONS

International Search Report for PCT/CN2018/083273 dated Jul. 2, 2018 titled "Vehicle Power Supply Module and Arrangement Method Therefor".

Primary Examiner — Hal Kaplan
Assistant Examiner — Swarna N Chowdhuri
(74) Attorney, Agent, or Firm — Hamilton, Brook, Smith & Reynolds, P.C.

(57) ABSTRACT

A power supply module for a vehicle comprises a battery system (13) including a first output terminal (Out 1) and a second output terminal (Out 2), wherein the battery system (13) is connected with a AC/DC converter (12) of the vehicle, the AC/DC converter (12) includes a DC terminal
(Continued)

(DC) and an AC terminal (AC), the DC terminal (DC) is connected with the first output terminal (Out 1) of the battery system (13) and the AC terminal (AC) is connected to a motor generator (11) of the vehicle cooperating with the power supply module (10), so as to form a first output ($i_1$), wherein the second output terminal (Out 2) is connected to a power supply distribution center (17) of the vehicle, so as to form a second output ($i_2$), and wherein the battery system (13) includes a lead-carbon battery. There are also provided a power supply system comprising the power supply module for a vehicle, a vehicle comprising the power supply system for a vehicle, and a method of arranging a power supply module for a vehicle. The lithium ion battery and the battery management system in the prior art are replaced with the lead-carbon battery. As the working environment temperature has little influence on the lead-carbon battery, the freedom for the arrangement position of the lead-carbon battery is increased. It is no longer necessary to arrange the lead-carbon battery away from the engine, or additionally take heat preservation factors into account. The lead-carbon battery may be arranged under the engine hood or next to the engine. As a result, the length of the cable required for connection will be greatly shortened, which effectively lowers the manufacturing cost.

20 Claims, 5 Drawing Sheets

(51) Int. Cl.
*B60R 16/02* (2006.01)
*B60L 50/64* (2019.01)
*B60L 50/60* (2019.01)
*B60L 50/51* (2019.01)
*B60L 1/00* (2006.01)

(52) U.S. Cl.
CPC ............ *B60L 50/64* (2019.02); *H01M 10/20* (2013.01); *H01M 10/425* (2013.01); *H01M 2010/4271* (2013.01); *H01M 2220/20* (2013.01)

(58) Field of Classification Search
CPC ....... H01M 10/425; H01M 2010/4271; H01M 2220/20
USPC .................................. 307/9.1, 10.1; 320/116
See application file for complete search history.

(56) References Cited

U.S. PATENT DOCUMENTS

| | | | |
|---|---|---|---|
| 2013/0167752 A1* | 7/2013 | Barbee | B61C 17/06 105/1.4 |
| 2014/0070608 A1* | 3/2014 | Achhammer | B60R 16/033 307/10.1 |
| 2015/0298631 A1* | 10/2015 | Belger | B60L 58/20 307/10.1 |
| 2016/0266210 A1* | 9/2016 | Kang | G01R 31/396 |
| 2016/0339858 A1* | 11/2016 | Fink | H02M 3/04 |

FOREIGN PATENT DOCUMENTS

| | | |
|---|---|---|
| CN | 103174949 A | 6/2013 |
| CN | 206049563 U | 3/2017 |
| JP | 2001119856 A | 4/2011 |
| JP | 2013095246 A | 5/2013 |

* cited by examiner

VEHICLE POWER SUPPLY MODULE AND ARRANGEMENT METHOD THEREFOR

This application is the U.S. National Stage of International Application No. PCT/CN2018/083273, filed Apr. 17, 2018, which designates the U.S., published in Chinese, and claims priority under 35 U.S.C. § 119 or 365(c) to CN Application No. 201710251073.1, filed Apr. 17, 2017. The entire teachings of the above applications are incorporated herein by reference.

FIELD

The present invention relates to a power supply module for use by a vehicle, a power supply system including the power supply module, and a vehicle including the power supply system. The present invention further relates to a method of arranging the power supply module on a vehicle.

BACKGROUND

A DC power supply (i.e., "battery") is required during use of a vehicle. For example, when the vehicle starts, the battery is required to provide a large current (hundreds of amperes) within a short time (several seconds), driving a kilowatt-class starting motor to bring an engine (an internal combustion engine using gasoline, diesel or natural gas) to a particular rotation speed, and then leading to spark ignition (gasoline) or compression ignition (diesel) of the engine. For a long time, on-road light vehicles (with a total weight less than or equal to 3.5 ton, also referred to as "passenger vehicles") across the world have been using 12V lead acid batteries. For nearly the last hundred years, the lead acid battery has been the sole choice for the starter battery of the vehicle because of its excellent low-temperature discharge performance and cost-effectiveness. Considering comprehensively many aspects, such as performance, cost and safety, the passenger vehicle power supply system has a maximum current that should be generally controlled to less than or equal to 250 amperes. Correspondingly, an upper limit of the steady-state output power of the 12V lead acid battery of the passenger vehicle is usually 3.0 kilowatts. The big commercial vehicles (medium-sized/heavy trucks and coaches etc.) tend to use 24V lead acid batteries because their starting motors require a DC supply power much higher than 3.0 kilowatts.

Along with the continuous development of automobile technologies in recent years, automobile manufacturers have already replaced the traditional mechanical pieces with an increasing number of new electrical devices, so that the vehicles are equipped with more and more electrical devices. The on board power supply is required in many technologies, e.g., active suspension, electric power steering, electric braking vacuum pump, electric heater, front-seat heating, heatable windshield, rear shock absorber, information entertainment system, adaptive cruise control, lane departure warning system, blind spot monitoring and micro-hybrid system etc. The total requirement of the electric power consumption of these electrical devices is much greater than 3.0 kilowatts, above the traditional 12V power supply system power ceiling. Therefore, the traditional 12V power supply system can hardly satisfy the ever-increasing power supplying demand of modern vehicles.

For this, the automobile industry turns to seek on board power supplies with higher voltage, among which a 48V/12V dual-voltage power supply system is a relatively successful solution. So as to maintain compatibility, the 48V/12V dual-voltage power supply system employs one 48V lithium ion battery accompanied with one 12V lead acid battery to meet the requirements of both numerous traditional 12V sub-kilowatt low-power electrical devices and various emerging kilowatt-class high-power electrical devices. In case that the maximum current of the system cable is held at 250 amperes, the 48V power supply can support the power requirement of 12.0 kilowatt power consumption.

Initiated by five big automobile manufacturers in Germany, Light Hybrid Technical Specification LV148 for 48V Passenger Vehicles was formulated in 2011 and adopted the above 12V/48V dual-voltage power supply system. The formulation of this technical specification embodies another advantage of the 12V/48V dual-voltage power supply system: cost-effective and energy-conserving and emission-reducing. Compared with the high-voltage (greater than 100V) full hybrid system for vehicles, the 48V light hybrid system can achieve approximate 70% of the oil-saving effect at 30% of the cost.

In June 2013, the European Union approved the carbon dioxide emission standard for the year of 2020 and this standard requires that the average carbon dioxide emission level for new vehicles should be limited to 95 g/km (corresponding to 4.0 L/100 KM) by 2020. This compulsory standard forces the original equipment manufacturers and the component suppliers to lower the oil consumption of the vehicles from different technical lines among which the 48V light hybrid technical solution is considered as an important part. In America, the light vehicle regulations for 2025 stipulate the fuel economy to be 54.5 miles/gallon (corresponding to 3.9 L/100 KM). Meanwhile, to meet the standard of the average oil consumption within 5.0 L/100 KM as required by China for 2020, a majority of the original equipment manufacturers, which either produce or sell the passenger vehicles in China, are planning to launch the 48V light hybrid system in the following years. Starting from 2017, the major automobile groups across the world also launched the 48V light hybrid vehicle type in Europe and America. It is anticipated that most of the light hybrid vehicles sold in Europe, North America and China will adopt the 48V system by 2025.

As described above, the currently used 12V/48V dual-voltage power supply system incorporates a new 48V lithium ion battery in addition to the traditional 12V lead acid battery. FIGS. 1a and 1b show an example 100 of the above power supply system, wherein 106 represents a traditional 12V lead acid battery; 103 represents a newly added 48V lithium ion battery; 101 is a motor generator, which charges the lithium battery 103 when the vehicle is driven by the engine or in a mode of regenerative braking; 102 is a bidirectional AC/DC converter; 105 is a 48V/12V bidirectional DC/DC converter; 104 is a battery management system for the lithium battery; 107 is a 12V power supply distribution center for connecting the power supply to the respective 12V electrical devices; 108 is a 48V power supply distribution center for connecting the power supply to the respective 48V electrical devices. It can be seen from the figures that in this solution, the 12V power supply is connected to traditional loads, e.g., watt-class low-power electrical devices, such as illumination, ignition, entertainment, sound system and electronic modules etc., so that the traditional vehicle electrical devices can be directly connected to the 12V power supply without any modifications. The new 48V power supply is mainly provided for supporting kilowatt-class high-power electrical devices, such as active chassis system, air condition compressor and regenerative braking system etc.

SUMMARY

However, the above 12V/48V dual-voltage power supply system also has technical defects in need of improvement. First of all, the vast majority of lithium ion batteries are sensitive to the temperature of the working environment, and generally charge and discharge in a working environment with a temperature ranging from 0 to 50° C. as they are sensitive to cold and heat. The vehicles are parked outdoors for a long time in cold winter season (the environment temperature is less than or equal to 0° C.) and the large-current charging and discharging capability of the lithium batteries in a low-temperature state is severely degraded. This directly affects the following two aspects: on the one hand, in order to protect the lithium ion battery from high and low temperature environments as much as possible, it is required to arrange the lithium ion battery within cab or trunk of the vehicle away from the engine. However, the 12V lead acid battery can function normally in a working environment with a temperature within a large range from −20° C. to +90° C., so it has been placed under the engine hood of the vehicle and next to the engine for nearly the last hundred years. Moreover, the 48V electric motor/generator is also located under the engine hood. Therefore, in order to connect the 48V lithium battery pack at the rear with the electric motor/generator and the 12V lead acid battery under the engine hood at the front, two large copper cables with a length of several meters are used to ensure safe transmission of a large current of hundreds of amperes, which will increase the system weight and cost. The significant increase of the cost compared with the traditional 12V vehicle system is just the main reason hindering the immediate wide application of the 48V light hybrid system.

To ensure cold start of the vehicle, all original equipment manufacturers require the starter battery to provide Cold Cranking Ampere (CCA) of hundreds of amperes at an environment temperature of minus 18° C. The existing mainstream lithium iron phosphate or ternary lithium batteries cannot satisfy the CCA requirement. Although the lithium titanate oxide battery can satisfy the CCA requirement, its cost is one order of magnitude higher than the lead acid battery, being difficult to be promoted. Based on the technical performance and cost of the existing lithium batteries, the 12V lead acid batteries of the vehicles with internal combustion engines cannot be replaced within nearly the next dozen of years. All of the above restricts the space and freedom for technical improvement.

Therefore, it is expected to further improve the existing 12V/48V dual-voltage power supply system to at least overcome one of the technical defects mentioned above.

In accordance with an aspect of the present invention, there is provided a power supply module for a vehicle comprising a battery system including a first output terminal and a second output terminal, wherein the battery system is connected with a AC/DC converter of the vehicle, the AC/DC converter includes a DC terminal and an AC terminal, the DC terminal is connected with the first output terminal of the battery system and the AC terminal is connected to a motor generator of the vehicle cooperating with the power supply module, so as to form a first output, wherein the second output terminal is connected to a power supply distribution center of the vehicle, so as to form a second output, and wherein the battery system includes a lead-carbon battery.

In the above solution, the lithium ion battery and the battery management system in the prior art are replaced with the lead-carbon battery. As the working environment temperature has little influence on the lead-carbon battery, the freedom for the arrangement position of the lead-carbon battery is increased. It is no longer necessary to arrange the lead-carbon battery away from the engine, or additionally take heat preservation factors into account. The lead-carbon battery may be arranged under the engine hood or next to the engine. As a result, the length of the cable required for connection will be greatly shortened, which effectively lowers the vehicle manufacturing cost.

The lead-carbon battery in fact is an asymmetric super capacitor energy storage that is quite suitable for high-rate charge and discharge applications. The lead-carbon battery is identical to the valve-regulated AGM lead acid battery in many aspects including battery structure, cathode (or positive plate), electrolyte, membrane, casing, producing process and the like. The lead-carbon battery differs from the AGM lead acid battery mainly in that its negative active material is totally activated carbon.

Furthermore, except that a new process is used to produce the all-carbon negative plate (anode), the lead-carbon battery and the AGM lead acid battery are basically identical to each other regarding the processes and devices for production. The cost (RMB/KWh) of the lead-carbon battery is between the AGM lead acid battery and the power-type lithium battery pack. Compared with the prior art combining the lithium battery and the lead acid battery, the advantage of the lead-carbon battery is to further lower the overall cost of the system while the system performance is maintained.

A power supply rated voltage at the first output terminal may be 48V. When the maximum current upper limit remains unchanged, a power supply network with a rated voltage of 48V can provide an output power 3 times higher than that of a power supply network with a rated voltage of 12V, so as to satisfy the ever-increasing integrated power demand of various electrical devices on modern vehicles.

Here, "power supply rated voltage" refers to an optimal voltage at which various electrical devices connected to the power supply network can operate normally for a long time. The actual voltage of the power supply system may fluctuate within a certain range above or below its rated voltage.

Preferably, a battery nominal voltage at the first output terminal is 60V. "Battery nominal voltage" refers to an open-circuit voltage when the charge state of a battery operating normally approaches 100%. The actual operating voltage of the lead-carbon battery has an upper limit of its nominal voltage and a lower limit of 25% of its nominal voltage. Those skilled in the art can appreciate that the actual output voltage of the lead-carbon battery fluctuates within a certain range as the charge state changes, leading to a relatively large difference from the nominal voltage. Therefore, even the measured battery voltage in practice is inconsistent with the nominal voltage claimed by the present invention, it should also be considered as falling within the protection scope.

A characteristic of the lead-carbon battery is that the change of the equivalent internal resistance of the battery as a function of the battery charge state is embodied in a U-shaped curve, as shown in FIG. 6. The lead-carbon battery has a small internal resistance within a partial charge interval and has a good charge and discharge performance in a large current. In accordance with the LV148 technical specification, the power supply system with a rated voltage of 48V has a very wide operating voltage window. When the power supply voltage is 36V~52V, all functions are enabled; when the power supply voltage is 24V~36V or 52V~54V, a part of the functions is enabled. In case of a lead-carbon battery group having a battery nominal voltage of 60V, when the foregoing operating voltage window of 36V~52V for all functions is implemented, the corresponding state of charge (SoC) of the lead-carbon battery is 40%~80%, which exactly corresponds to an operating interval where the lead-carbon battery has a minimal internal resistance and a best high-power charge and discharge performance. This solution is quite consistent with the LV148 technical specification in the wide operating voltage window, which is also a technical advantage of the present solution.

The power supply rated voltage at the second output terminal is 12V. Similar to the above, when the actual battery output voltage fluctuates within a certain range, it may deviate from the rated voltage of 12V. The vast majority of various electrical devices with a rated voltage of 12V on the vehicle can operate normally within a voltage range of 9V~16V. Preferably, a lead-carbon battery with a battery nominal voltage of 16V is selected to match with a power supply network with a rated voltage of 12V. The second output terminal may be implemented by a tap of a 60V lead-carbon battery group.

In a solution, the second output terminal of the lead-carbon battery is connected directly to the power supply distribution center of the vehicle. "Directly" here means that an original 12V lead acid battery in the 12V/48V dual-voltage power supply system is no longer present between the lead-carbon battery and the power supply distribution center, and does not mean that the lead-carbon battery is connected to the power supply distribution center only by a single wire. In fact, those skilled in the art can understand that it is possible to dispose auxiliary circuit elements different from the 12V lead acid battery between the lead-carbon battery and the power supply distribution center according to the actual application requirements. Adding these auxiliary circuit elements will not affect the implementation of the solution of the present invention and thus should be included in the protection scope of the present invention.

Because the temperature of the working environment has little influence on the lead-carbon battery, it may be effectively ensured that the lead-carbon battery still can output a current of hundreds of amperes to the starting motor even in a low-temperature environment, such as minus 18° C., so as to realize cold start of the engine. As such, the 12V lead acid battery in the existing 12V/48V dual-voltage power supply system is no longer indispensable, and its power supply functions may fully be replaced with the second output from the lead-carbon battery module. Therefore, after the 12V lead acid battery and the 48V/12V DC converter are removed, the cost of the vehicle power supply system can be further remarkably reduced.

Meanwhile, the removal of the 12V lead acid battery also can free up the space occupied by it and give more freedom to vehicle design. In addition, the total weight and thus the oil consumption of the vehicle and the maintenance cost of the power supply system may also be decreased.

In another solution, the power supply module for a vehicle also includes a DC converter disposed between the second output terminal and the power supply distribution center. In this solution, the lead-carbon battery may have only one output voltage and the output voltage is reduced by the DC converter to form a second voltage. On the one hand, the structure of the lead-carbon battery may be simpler and on the other hand, even if the input voltage of the DC converter fluctuates in a relatively broad range (e.g., 24V~54V), the output voltage still can remain stable (e.g., 12V), which is suitable for powering various 12V on board electrical devices.

Optionally, the power supply module for a vehicle also includes a diode and a lead acid battery. The diode and lead acid battery are placed between the second output terminal and the power supply distribution center. In this case, when the voltage at the second output terminal is relatively high, the diode conducts in a forward direction to charge the lead acid battery and restricts the charge current. When the battery system is performing large current discharge, the output voltage at the second output terminal is significantly reduced below the voltage of the lead acid battery, causing reverse disconnection of the diode and thus implementing effective electrical isolation between power supplies with different voltages.

Optionally, the lead-carbon battery includes a first battery pack and a second battery pack in series. The first output terminal is connected to an end of the second battery pack that is not connected with the first battery pack. The second output terminal is connected between the first battery pack and the second battery pack. As such, the lead-carbon battery can provide two different rated voltages for power supplying requirements of different electrical devices.

In accordance with another aspect of the present invention, there is provided a power supply system for a vehicle comprising any of the above power supply modules for a vehicle, and the AC/DC converter and the motor generator of the vehicle.

In accordance with a further aspect of the present invention, there is provided a vehicle comprising the above power supply system for a vehicle.

Further, the vehicle also includes a powertrain system and the motor generator may be placed at P0, P1, P2, P3 or P4 position of the powertrain system of the vehicle. Herein, P0 position is located at the end of the engine further away from the gearbox, where the electric motor generator is usually connected with the engine via a belt; P1 position is located at the end of the engine near the gearbox, where the electric motor generator is directly integrated on the crankshaft of the engine; P2 position is located between the engine and the gearbox and behind the clutch K0 or K1; P3 position is located at an output end of the gearbox and before the half axle; and P4 position is located between the half axle and the hub.

In accordance with a fourth aspect of the present invention, there is provided a method of arranging a power supply module for a vehicle, comprising steps of:
  providing a power supply module for a vehicle that includes a battery system, the battery system including a lead-carbon battery, a first output terminal and a second output terminal;
  connecting the power supply module for a vehicle to a DC/AC converter and a motor generator cooperating with the power supply system, wherein the DC/AC converter includes a DC terminal and an AC terminal;
  specifically, connecting the DC terminal to the first output terminal and the AC terminal to the motor generator, so as to form a first output;
  connecting the second output terminal to a power supply distribution center of the vehicle, so as to form a second output.

Optionally, the step of connecting the second output terminal to a power supply distribution center of the vehicle comprises directly connecting the second output terminal to the power supply distribution center of the vehicle.

Optionally, a diode (D) and a lead acid battery (LAB) may be further provided. The step of connecting the second output terminal (Out 2) to a power supply distribution center (27) of the vehicle comprises connecting the second output terminal (Out 2) to the power supply distribution center (27) via the diode (D) and the lead acid battery (LAB).

BRIEF DESCRIPTION OF THE DRAWINGS

Other features, objectives and advantages of the present invention will become more apparent through reading the detailed description of the non-limiting embodiments with reference to the following accompanying drawings:

FIG. 1b shows a schematic circuit diagram of the vehicle power supply system as shown in FIG. 1a;

FIG. 2b shows a schematic circuit diagram of the vehicle power supply system as shown in FIG. 2a;

FIG. 3b shows a schematic circuit diagram of the vehicle power supply system as shown in FIG. 3a;

DETAILED DESCRIPTION OF EMBODIMENTS

The present invention will be further described in details below with reference to the drawings in the embodiments of the present invention. It should be understood that embodiments described here are only for the purpose of illustrating and explaining the present invention, rather than restricting the present invention. Other embodiments, which can be acquired by those ordinary skilled in the art based on the embodiments in the present invention without any exercises of inventive work, also fall into the protection scope of the present invention.

Figure 2A:
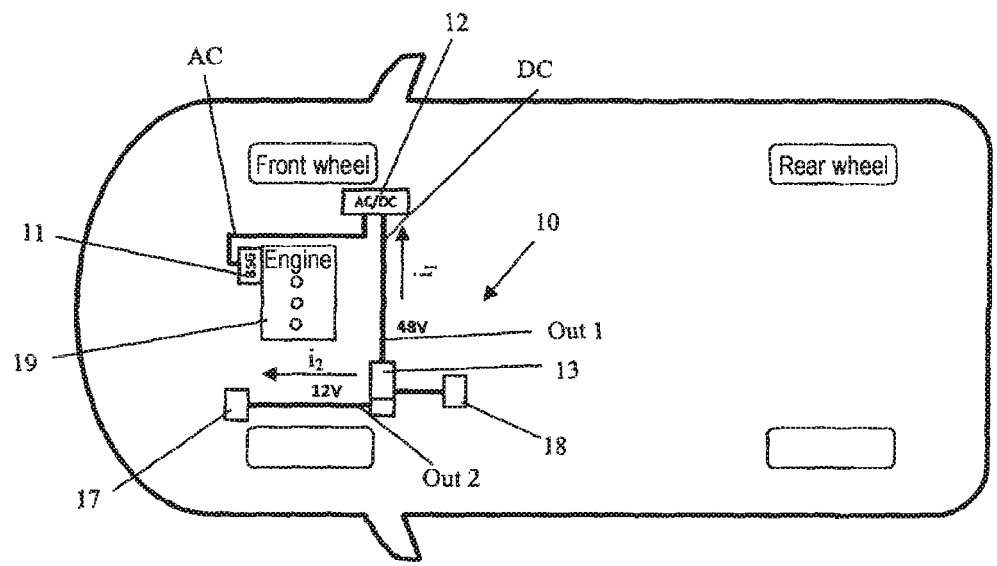
FIG. 2a shows a schematic diagram of a first embodiment of a vehicle power supply system in accordance with the present invention.
Figure 2B:
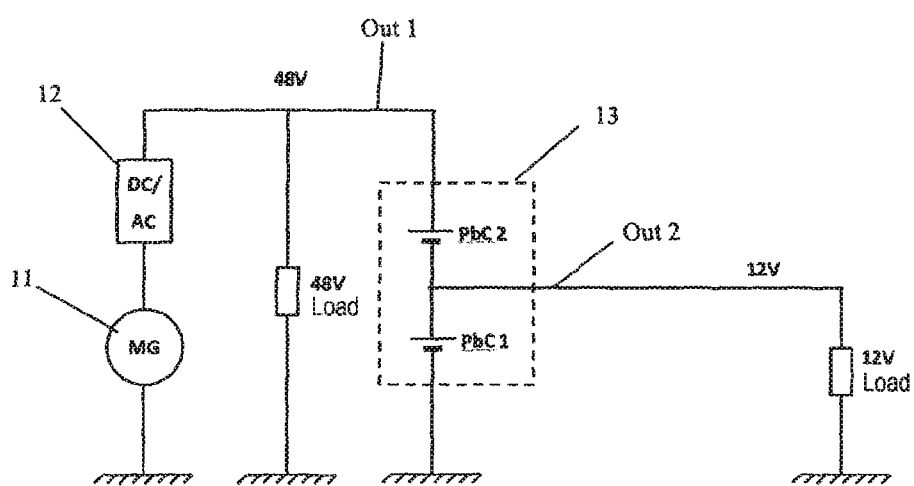

FIGS. 2a and 2b show a first embodiment of a vehicle power supply system in accordance with the present invention. In FIGS. 2a and 2b, in addition to the power supply system 10 of the vehicle, an engine 19, a 48V power supply distribution center 18 and a 12V power supply distribution center 17 of the vehicle are also shown.

The power supply system 10 mainly includes a motor generator 11, a battery system 13 and a AC/DC converter 12.

On the one hand, when the vehicle is driven by the engine or is in regenerative braking mode to recover energy, the motor generator 11 can generate electricity to supply power to the 48V power supply network and charge the battery system 13. On the other hand, with power from the battery system 13, the engine 19 may be started or an assistant torque may be provided.

In this embodiment, the battery system 13 includes a lead-carbon battery group with a nominal voltage of 60V. The battery group has a first output terminal Out 1 and a second output terminal Out 2, providing two different rated voltages: 48V and 12V. For example, the rated voltage of the first output terminal Out 1 is 48V and its output voltage has a range of 24V~54V; while the rated voltage of the second output terminal Out 2 is 12V and its output voltage has a range of 9V~16V.

As shown in FIG. 2a, the first output terminal Out 1 of the battery system 13 is connected to a DC terminal of the AC/DC converter 12, and the AC terminal AC of the AC/DC converter 12 is connected to the starter/generator 11, so as to form a first output $i_1$. On the one hand, the AC/DC converter 12 may play the role of rectifying an alternating current from the starter/generator 11 into a direct current, to supply power to the 48V power supply network and to charge the 60V lead-carbon battery group. On the other hand, the AC/DC converter 12 may also invert a direct current from the lead-carbon battery into an alternating current, to drive the starter/generator 11, start the engine 19 or provide an assistant torque to the engine.

The second output terminal Out 2 of the battery system 13 is connected with the power supply distribution center 17 of the vehicle to form a second output $i_2$. The 12V power supply distribution center 17 plays the role of distributing a direct current to various electrical devices with a rated voltage of 12V on the vehicle and providing short-circuit and overcurrent protection.

As shown in FIG. 2b, a circuit structure of the battery system 13 includes two lead-carbon batteries PbC1 and PbC2 in series. A nominal voltage of the first lead-carbon battery PbC1 is 16V, and a nominal voltage of the second lead-carbon battery PbC2 is 44V. Accordingly, the second output terminal Out 2 tapped between the first and second lead-carbon batteries PbC1 and PbC2 and the first output terminal Out 1 at an end of the second lead-carbon battery PbC2 that is not connected with the first lead-carbon battery PbC1 are connected with two power supply networks respectively having a rated voltage of 12V and 48V. Therefore, a convenient solution for implementing 12V/48V dual-voltage output is provided. In this solution, a 48V/12V bidirectional DC/DC converter is not required for converting and outputting the DC voltages, which may further lower the system cost.

Figure 3A:
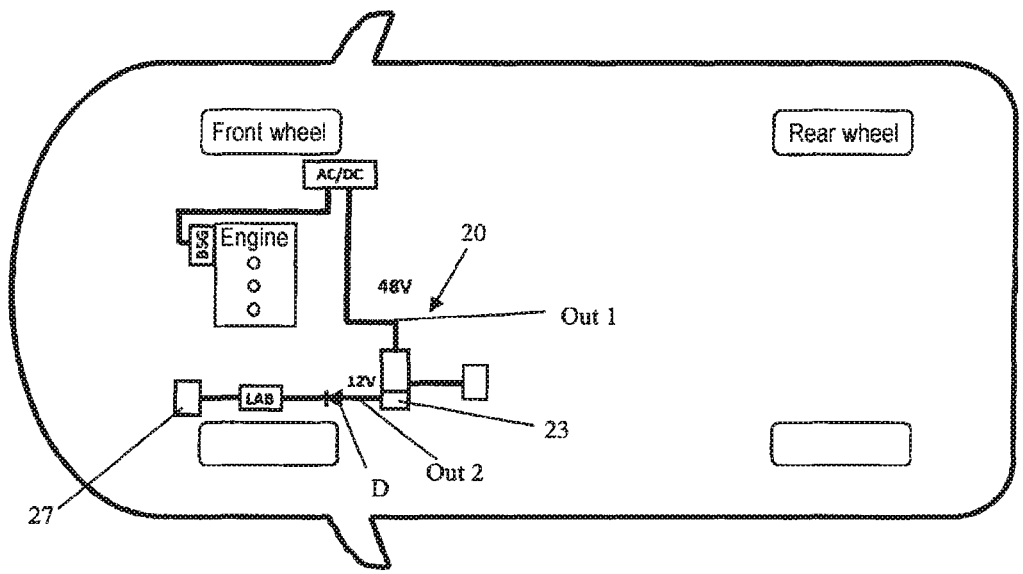
FIG. 3a shows a schematic diagram of a second embodiment of a vehicle power supply system in accordance with the present invention.
Figure 3B:
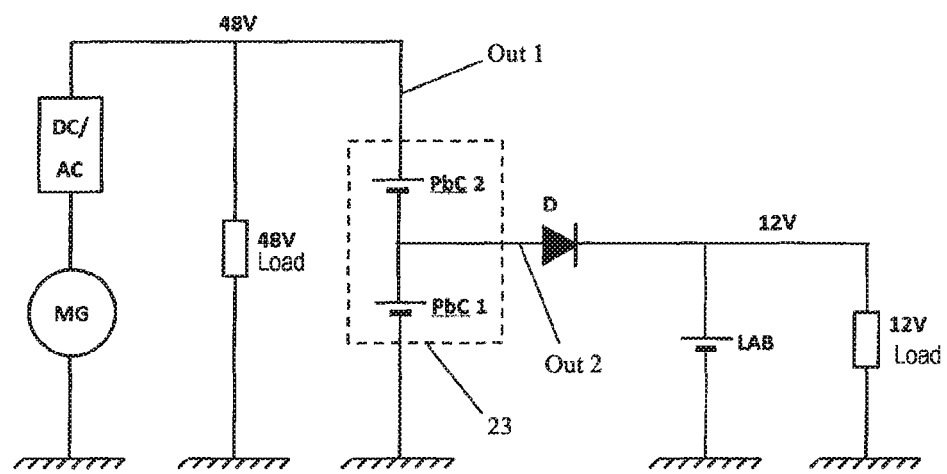

FIGS. 3a and 3b show a second embodiment of a vehicle power supply system in accordance with the present invention. It can be seen from the figures that the vehicle power supply system 20 has a structure and an arrangement similar to the vehicle power supply system 10 in the first embodiment. The similar parts will not be elaborated here.

The vehicle power supply system 20 differs from the vehicle power supply system 10 mainly in that the vehicle power supply system 20 also includes a high power diode D and a lead acid battery LAB with a nominal voltage of 12V, wherein the high power diode D is disposed between the second output terminal Out 2 and the lead acid battery LAB. When the SoC of the first lead-carbon battery PbC1 is higher than 60%, it may charge the lead acid battery LAB via the conducting diode D in forward bias and the diode D restricts the charging current. When the battery system 23 discharges a large current to the 48V power supply network, the output voltage of the first lead-carbon battery PbC1 drops significantly below the 12V voltage of the lead acid battery LAB, causing disconnection of the diode D in reverse bias and thus implementing effective electrical isolation between the 48V power supply and 12V power supply.

Figure 4:
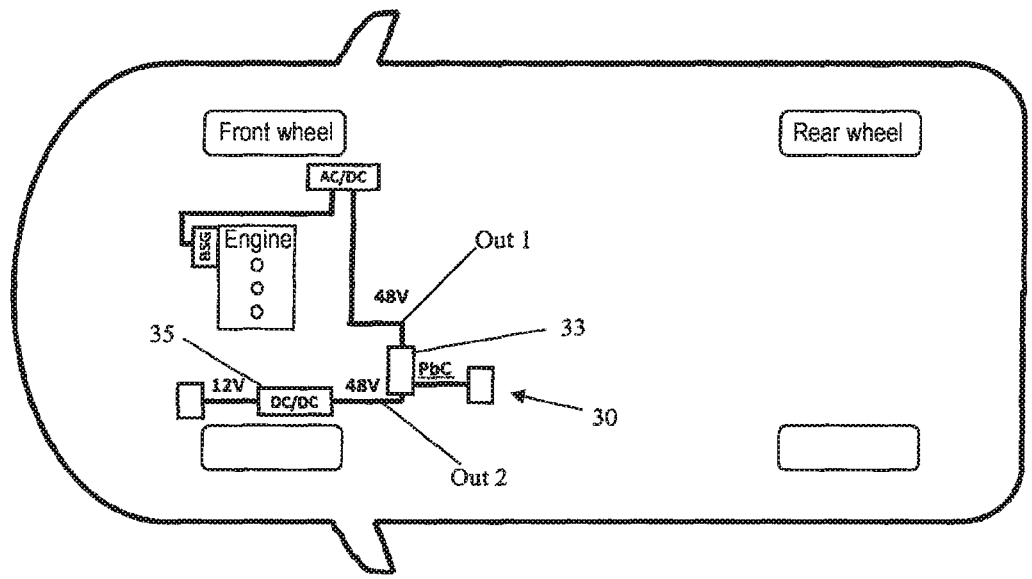
FIG. 4 shows a schematic diagram of a third embodiment of a vehicle power supply system in accordance with the present invention.

FIG. 4 shows a schematic diagram of a third embodiment of a vehicle power supply system in accordance with the present invention, i.e., a vehicle power supply system 30. Likewise, the parts in the structure and arrangement identical to the vehicle power supply systems 10 and 20 in the above two embodiments will not be elaborated here.

Figure 1A:
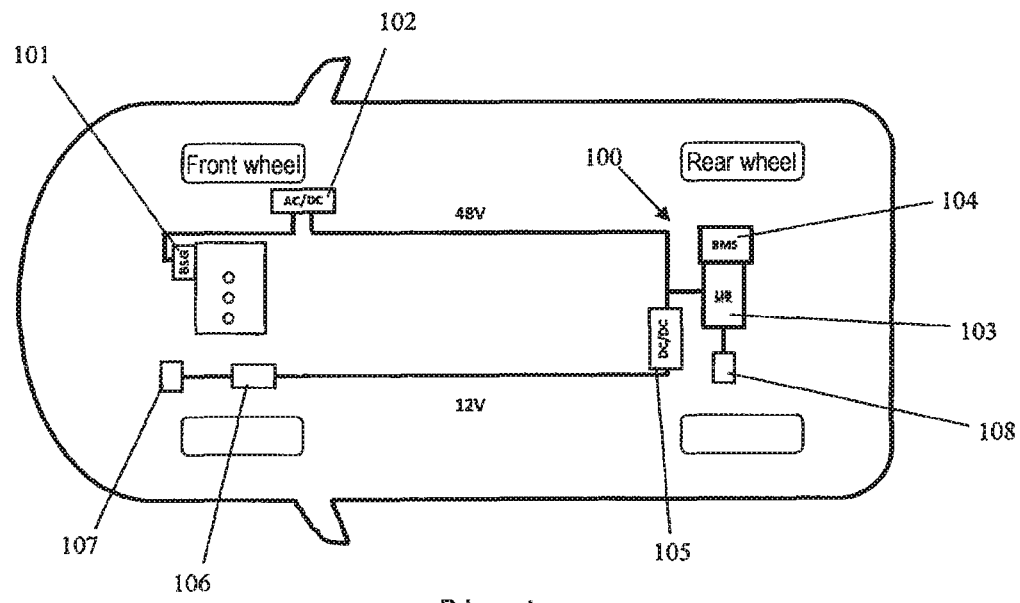
FIG. 1a shows a schematic diagram of an existing vehicle power supply system, which adopts a 12V/48V dual-voltage power supply system.
Figure 1B:
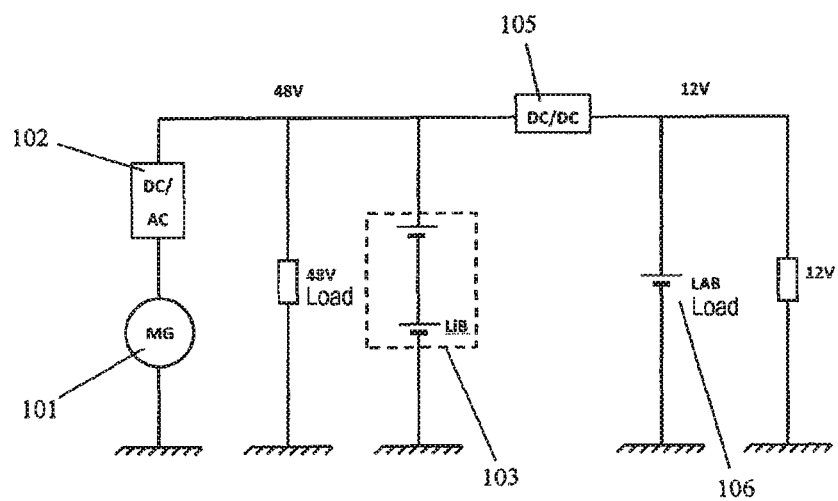

The vehicle power supply system 30 is featured in that the battery system 33 only provides a rated voltage output of 48V and a rated voltage output of 12V is provided by the 48V/12V DC/DC converter 35. Even with the addition of a DC/DC converter 35, the complexity of the battery system 33 may be lowered because two voltage outputs are not necessary for the battery system 33. Moreover, because of adding the DC/DC converter 35, the input operating voltage may have a broader range. For example, when the actual operating voltage fluctuation of the 48V power supply network expands to 24V~54V, the DC/DC converter 35 still can maintain a stable output voltage of 12V. Compared with the prior art in FIGS. 1a and 1b, this embodiment can further lower the overall cost of the 48V light hybrid system while maintaining various performance indicators of the system.

Figure 5:
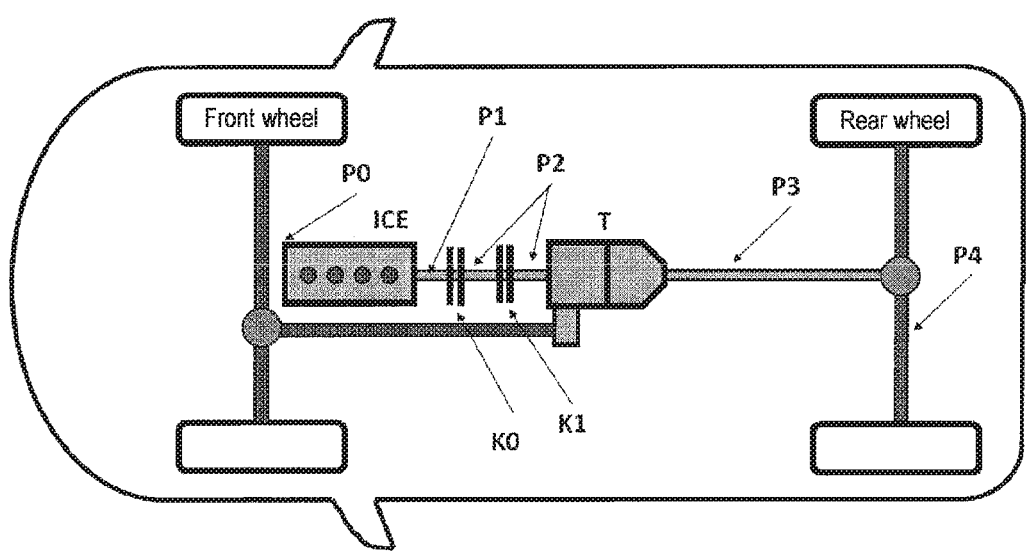
FIG. 5 shows an access position of a motor generator of a vehicle power supply system in accordance with the present invention in a powertrain system of a vehicle.
Figure 6:
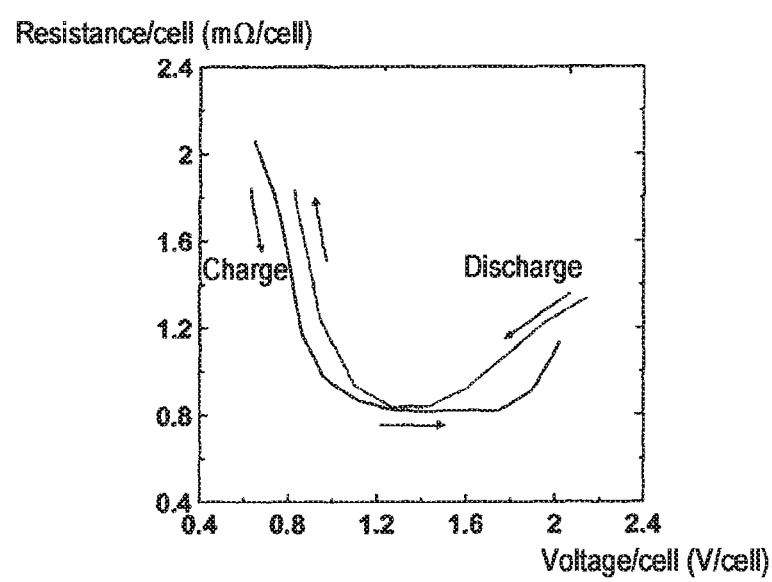
FIG. 6 shows a curve of the change of an equivalent internal resistance of a lead-carbon battery as a function of a battery charge state. (SoC)

FIG. 5 shows access positions of the starters/generators in the vehicle power supply system 10, 20 and 30 in the embodiments in a powertrain system of a vehicle. The starters/generators are all accessed at P0 position in FIGS. 2a, 3a and 4. In fact, the starter/generator connected with the vehicle power supply system in accordance with the present invention may also be accessed at P1, P2, P3 or P4 position of a vehicle powertrain system. The application of the technology of the present invention has a very high flexibility and freedom.

For those skilled in the art, it is obvious that the present invention is not limited to the details of the above example embodiments and the present invention can be implemented in other specific forms without departing from the spirit or the basic features of the present invention. Therefore, from every point of view, the embodiments should be regarded as exemplary and non-limiting.

We claim:

1. A power supply module for a vehicle, comprising:
   a battery system (13) including a first output terminal (Out 1) and a second output terminal (Out 2),
   wherein the battery system (13) is connected with a AC/DC converter (12) of the vehicle, the AC/DC converter (12) includes a DC terminal (DC) and an AC terminal (AC), the DC terminal (DC) is connected with the first output terminal (Out 1) of the battery system (13) and the AC terminal (AC) is connected to a motor generator (11) of the vehicle cooperating with the power supply module (10), so as to form a first output ($i_1$),
   wherein the second output terminal (Out 2) is connected to a power supply distribution center (17) of the vehicle, so as to form a second output ($i_2$), and
   wherein the battery system (13) is configured as a lead-carbon battery group.

2. The power supply module for a vehicle of claim 1, wherein a power supply rated voltage at the first output terminal (Out 1) is 48V.

3. The power supply module for a vehicle of claim 2, wherein a battery nominal voltage at the first output terminal (Out 1) is 60V.

4. The power supply module for a vehicle of claim 1, wherein a power supply rated voltage at the second output terminal (Out 2) is 12V.

5. The power supply module for a vehicle of claim 4, wherein a battery nominal voltage at the second output terminal (Out 2) is 16V.

6. The power supply module for a vehicle of claim 1, wherein the second output terminal (Out 2) of the lead-carbon battery group is directly connected to the power supply distribution center (17) of the vehicle.

7. The power supply module for a vehicle of claim 1, further comprising a DC/DC converter (35) disposed between the second output terminal (Out 2) and the power supply distribution center.

8. The power supply module for a vehicle of claim 1, further comprising a diode (D) and a lead acid battery (LAB), wherein the diode (D) and lead acid battery (LAB) are disposed between the second output terminal (Out 2) and the power supply distribution center (27).

9. The power supply module for a vehicle of claim 1, wherein the lead-carbon battery group includes a first battery pack (PbC1) and a second battery pack (PbC2) in series, the first output terminal (Out 1) is connected to an end of the second battery pack (PbC2) that is not connected with the first battery pack (PbC1), and the second output terminal (Out 2) is connected between the first battery pack (PbC1) and the second battery pack (PbC2).

10. A power supply system (10, 20, 30) for a vehicle, comprising:
    a power supply module;
    a DC/AC converter (12); and
    a motor generator (11);
    the power supply module having (i) a battery system that includes a first output terminal and a second output terminal, the battery system connected with an AC/DC converter of the vehicle, the AC/DC converter including a DC terminal (DC) and an AC terminal (AC), the DC terminal being connected with the first output terminal of the battery system and the AC terminal being connected to a motor generator of the vehicle that cooperates with the power supply module, so as to form a first output, the second output terminal being connected to a power supply distribution center of the vehicle, so as to form a second output, and the battery system is configured as a lead-carbon battery group.

11. A vehicle, comprising the power supply system (10, 20, 30) for a vehicle according to claim 10.

12. The vehicle of claim 11, further comprising a powertrain system, wherein the motor generator (11) is disposed at P0, P1, P2, P3 or P4 position of the powertrain system.

13. A method of arranging a power supply module for a vehicle, comprising steps of:
    providing a power supply module for a vehicle that includes a battery system (13), the battery system (13) configured as a lead-carbon battery group, a first output terminal (Out 1) and a second output terminal (Out 2);
    connecting the power supply module (10) for a vehicle to a AC/DC converter (12) and a motor generator (11) cooperating with the power supply module (10), wherein the AC/DC converter (12) includes a DC terminal (DC) and an AC terminal (AC);
    connecting the DC terminal (DC) to the first output terminal (Out 1) and the AC terminal (AC) to the motor generator (11), so as to form a first output ($i_1$);
    connecting the second output terminal (Out 2) to a power supply distribution center (17) of the vehicle, so as to form a second output ($i_2$).

14. The method of arranging a power supply module for a vehicle of claim 13, wherein the step of connecting the second output terminal (Out 2) to a power supply distribution center (17) of the vehicle comprises directly connecting the second output terminal (Out 2) to the power supply distribution center (17) of the vehicle.

15. The method of arranging a power supply module for a vehicle of claim 13, further comprising providing a diode (D) and a lead acid battery group (LAB), wherein the step of connecting the second output terminal (Out 2) to a power supply distribution center (17) of the vehicle comprises connecting the second output terminal (Out 2) to the power supply distribution center (27) via the diode (D) and the lead acid battery group (LAB).

16. The power supply system of claim 10, wherein a power supply rated voltage at the first output terminal is 48V.

17. The power supply system of claim 10, wherein a battery nominal voltage at the first output terminal is 60V.

18. The power supply system of claim 10, wherein a power supply rated voltage at the second output terminal is 12V.

19. The power supply system of claim 10, wherein battery nominal voltage at the second output terminal is 16V.

20. The power supply system of claim 10, wherein the second output terminal of the lead-carbon battery group is directly connected to the power supply distribution center of the vehicle.

* * * * *